United States Patent [19]

Ulich et al.

[11] Patent Number: 4,905,009
[45] Date of Patent: Feb. 27, 1990

[54] DISTANCE MEASURING DEVICE

[75] Inventors: Bobby L. Ulich, Tuscon, Ariz.; Gregory H. Ames; Albert J. Lazzarini, both of Colorado Springs, Colo.; Edward K. Conkun, Hermosa Beach, Calif.

[73] Assignee: Kaman Aerospace Corporation, Bloomfield, Conn.

[21] Appl. No.: 56,964

[22] Filed: Jun. 1, 1987

[51] Int. Cl.4 .............................................. G01S 13/32
[52] U.S. Cl. ..................................... 342/118; 342/128
[58] Field of Search ....................... 342/118, 122, 128

[56] References Cited

U.S. PATENT DOCUMENTS

| 3,081,455 | 3/1963 | Beling et al. | 342/118 X |
| 3,167,766 | 1/1965 | Norris, Jr. | 342/122 X |
| 3,264,643 | 8/1966 | Nilssen | 342/118 |
| 3,577,143 | 5/1971 | Poirier et al. | 342/118 |
| 3,603,990 | 9/1971 | Poirier | 342/118 X |
| 3,614,226 | 10/1971 | Vergoz | 342/118 X |
| 3,652,161 | 3/1972 | Ross | 342/118 X |
| 4,427,981 | 1/1984 | Kyriakos | 342/122 |
| 4,435,708 | 3/1984 | Kyriakos | 342/122 |
| 4,568,938 | 2/1986 | Ubriaco | 342/122 X |
| 4,599,618 | 7/1986 | Haendel et al. | 342/122 X |

Primary Examiner—Stephen C. Buczinski
Assistant Examiner—John B. Sotomayor
Attorney, Agent, or Firm—McCormick, Paulding & Huber

[57] ABSTRACT

A distance measuring device transmits a continuous alternating wave from a wave source to a target which reflects it back toward the device. The wave source is activated until such time that a detector associated with the device senses the beginning of the reflected wave at which time the wave source is deactivated. The wave source is deactivated during the time that the reflected wave is sensed by the detector and upon the sensing of the end of the reflected wave, the wave source is again activated. The frequency at which the wave source is alternately activated and deactivated is a measure of the distance between the measuring device and the target.

8 Claims, 2 Drawing Sheets

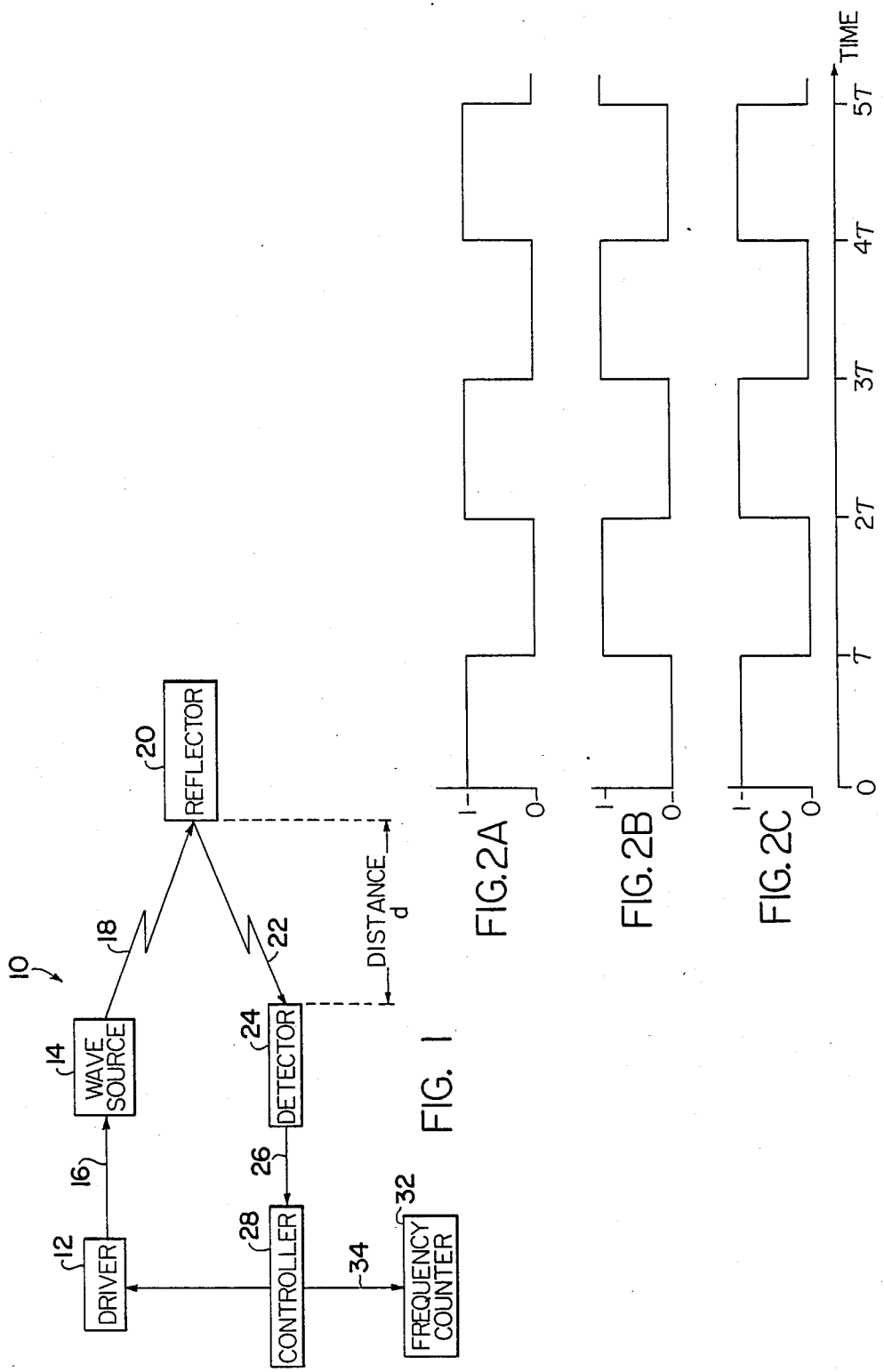

DISTANCE MEASURING DEVICE

BACKGROUND OF THE INVENTION

The present invention relates generally to distance measuring devices and deals more specifically with a distance measuring device arranged as a relaxation oscillator wherein the frequency of oscillation is a measure of the distance between the device and a remote target.

Distance measuring devices using the concept of transmitting an electromagnetic wave signal toward a target and then measuring the time lapse to receive a reflected wave as a measurement of the distance between the device and the target are generally known in the art. A distance measuring device of the time lapse type is described in U.S. Pat. No. 3,246,322 issued Apr. 12, 1966 to Kuecken. Kuecken discloses the transmission of finite duration continuous wave signals modulated at a given frequency wherein reflection of the signal is used to control the modulation rate of the transmitted signal. The transmitted signals are generally of short duration and the reception of a reflected signal is used to activate the transmitter to generate a new signal. The time interval between output signal generations is the round-trip travel time of the transmitted signal from the device to a reflecting target and back to the device.

Another distance measuring system of the time lapse type is disclosed in U.S. Pat. No. 3,503,680 issued Mar. 31, 1970 to Schenkerman which uses a concept similar to Kuecken in that an echo return pulse is used to activate a transmitter to send out another pulse wherein the process is repeated until a predetermined number of echo pulses have been received. The time required to receive the predetermined number of pulses is proportional to the distance.

There are a number of disadvantages associated with the known distance measuring devices which have an adverse effect on the accuracy of a measurement. Devices in which time is measured to determine distance are generally effected by low signal-to-noise ratios.

Additionally, the known devices often employ numerical averaging techniques to average a relatively large number of time interval measurements to increase the accuracy of the time measurement used in determining the distance.

Another disadvantage associated with the known measuring devices is the large systematic measurement errors that may occur due in part to the high number of round-trip propagation times that are detected in a predetermined time interval. Other errors are in part due to the less than precise pulse detection techniques used to sense the start and end of a reflected signal wherein such techniques include for example, detection of the zero crossing of a reflected signal. The sources of error are applicable not only to continuous wave type distance measuring devices but also to those in which pulse signal techniques are used.

A further disadvantage of the known distance measuring devices is the relatively high cost and expense associated with the complex electrical components and subassemblies required to transmit and sense reflected pulses and to time average propagation times.

It is an object of the present invention therefore to provide a distance measuring device that overcomes the drawbacks and disadvantages associated with known distance measuring devices.

It is a further object of the present invention to provide a distance measuring device configured as a relaxation oscillator wherein the oscillation frequency is used to determine the distance between the device and a remote target.

It is yet a further object of the present invention to provide a distance measuring device that is constructed of relatively low cost components and yet achieves highly accurate distance measurements.

SUMMARY OF THE INVENTION

In accordance with the present invention, a distance measuring device is presented wherein a continuous alternating wave is transmitted from a wave source to a remote target from which the wave is reflected back toward the device. A detector senses the reflected wave and upon the detection of the beginning of the reflected signal, deactivates the wave source. Upon the detection of the end of the reflected wave, the wave source is again activated to transmit another continuous wave signal. The distance measuring device operates as a relaxation oscillator with the wave source being alternately activated and deactivated. The frequency of oscillation of the measurement device is used to determine the distance between the device and remote target from which the transmitted waves are reflected.

BRIEF DESCRIPTION OF THE DRAWINGS

Other features and advantages of the present invention will become readily apparent from the following description and claims taken in conjunction with the drawings wherein:

FIG. 1 is a schematic block diagram illustrating the major functional components of the distance measuring device embodying the present invention.

FIG. 2a is a waveform representation showing the variation with time of the output of the wave source.

FIG. 2b is a waveform representation showing the variation of the output of the detector with time.

FIG. 2c is a waveform representation showing the variation with time of the output of the controller of FIG. 1.

DETAILED DESCRIPTION OF THE PREFERRED EMBODIMENTS

Figure 3:
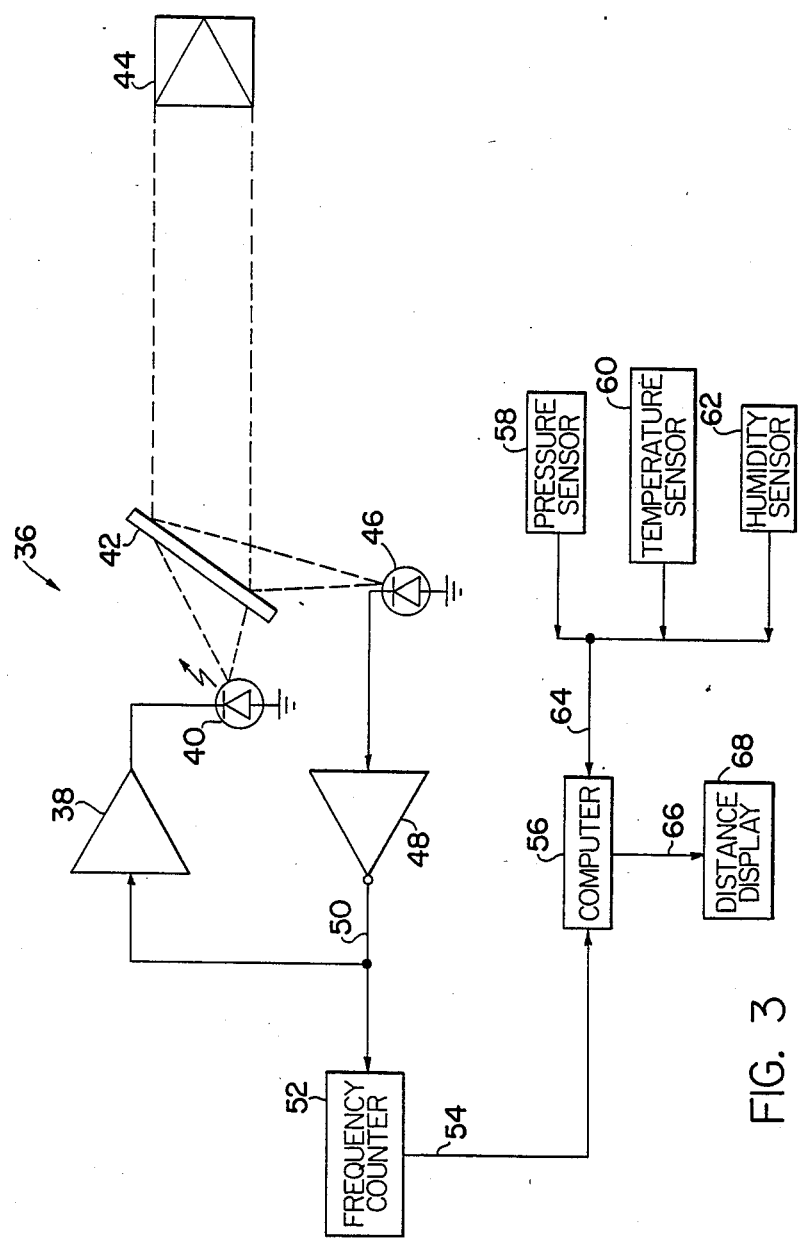
FIG. 3 is a schematic representation of a specific embodiment of a distance measuring device embodying the present invention.

Turning now to the drawings and considering FIGS. 1 and 2 in particular, a somewhat schematic, functional block diagram of the major system components embodying the present invention is shown in FIG. 1 wherein a driver 12 is coupled to a wave source 14 by lead 16 to activate and deactivate the wave source. When the distance measuring device 10 is turned on, the driver 12 activates the wave source 14 causing it to transmit a continuous alternating wave along a transmission path generally designated 18 in a direction toward a remote reflector or target 20 located a distance "d" from the wave source. The reflector 20 reflects the transmitted wave signal along a transmission path generally designated 22 in a direction toward a detector 24 located at the measuring device in the region of the wave source 14. When the detector 24 senses the beginning of the transmitted wave being reflected from the target, it produces an output signal on lead 26 which is coupled to a controller 28. The controller 28 has an output control signal that is coupled to the input of the driver 12 by a lead 30. During the time the detector 24 senses the reflected wave, the output control signal from the controller 28 inhibits the driver 12. The output signal from the driver 12 in turn deactivates the wave source 14. When the detector 24 senses the end of the transmitted wave being reflected from the target, it produces a signal on lead 26 which causes the controller 28 to produce a driver enabling signal on lead 30 which in turn causes the driver 12 to reactivate the wave source 14. The wave source 14 now transmits another continuous wave signal along the transmission path 18 toward the reflector 20. The process is repeated with the wave source 14 alternately being activated and deactivated the frequency of which activation is a measure of the distance between the wave source and the target.

A counter 32 is coupled to another output of the controller 28 via a lead 34 and senses the frequency at which the distance measuring device 10 turns "on" and "off". It will be recognized that the distance measuring device 10 is configured as a relaxation oscillator or a bistable oscillator utilizing negative feedback, that is, when the reflected signal is present or sensed at the detector 24, the wave source is disabled and in the absence of sensing a reflected signal at the detector, the wave source is enabled.

The round-trip propagation time from the source to the target and back to the detector is expressed generally as $$\tau = \frac{2d}{v}$$

where $2d$ is the round-trip or two-way path length, and $v$ is the wave propagation velocity. In the case of a sonic wave, the wave propagation velocity is the speed of sound. If electromagnetic waves are used, the wave propagation velocity is equal to C/n where C is the speed of light in a vacuum and n equals the index of refraction of the medium through which the electromagnetic waves are transmitted. In the case of electromagnetic waves, the round trip propagation time is expressed as $$\tau = \frac{2nd}{c}$$

If the time delay in the electronics comprising the various system components is considered to be negligible, (in actuality non-zero time delays are present and must be compensated for in order to obtain highly accurate measurements and such compensation is discussed in further detail below), then the length of the continuous wave signal is $2d$ (two-way path length) long in space and $\tau$ seconds long in time.

Considering FIGS. 2a, 2b and 2c, FIG. 2a shows the wave source is active during the time interval $0-\tau$ and then becomes deactivated after the time interval has lapsed. FIG. 2b shows the output of the detector 24 is not active or "off" during the interval $0-\tau$ and after the time interval has lapsed, it is seen that the output of the detector 24 changes state causing the wave source 14 via the controller 28 and driver 12 to become inactive.

As shown in FIG. 2c, the output of the controller 28 also varies in a square wave fashion such that its output causes the driver to be enabled in the time interval $0-\tau$ and disabled in the next time interval $\tau-2\tau$. It can be seen that the wave source 14 is enabled during the time interval that the controller 28 provides an enabling signal to the driver 12.

The frequency of the output signal produced by the controller 28 is expressed as $$f^1 = \frac{1}{2\tau^1}$$

If $\tau^1$ is expressed as $2d/v$ then the frequency of the controller output signal is $$f = \frac{v}{4d}$$

for a sonic wave.

For an electromagnetic wave, $$f = \frac{C}{4nd}$$

If it is assumed that an electromagnetic wave travels with the speed of light in a transmission medium having an index of refraction (n) equal to one, then the ratio $C/n = 3 \times 10^8$ meters/second. For a given distance d, the frequency of the output signal and the time interval $\tau$ in seconds is determined from the above formulas and the results of which are tabulated in Table 1.

TABLE 1

| d | 1 mm | 1 cm | 10 cm | 1 m | 10 m | 100 m | 1 km | 100 km | $10^4$ km |
|---|---|---|---|---|---|---|---|---|---|
| f | 75 GHz | 7.5 GHz | 750 MHz | 75 MHz | 7.5 MHz | 750 KHz | 75 KHz | 750 Hz | 7.5 Hz |
| $\tau'$ | 6.7 psec | 67 psec | 670 psec | 6.7 nsec | 67 nsec | 670 nsec | 6.7 usec | 670 usec | 67 msec |

Consequently, it is seen that by measuring the frequency of the output signal from the controller 28, the distance d can be determined if the wave propagation velocity is known and the distance d is expressed in the following formulas:

$$d = \frac{v}{4f},$$

for sonic waves and $$d = \frac{C}{4nf},$$

for electromagnetic waves.

Because the distance measuring device embodying the present invention functions as a relaxation oscillator and measures frequency to determine the distance between the device and a remote target, the continuous alternating wave generated by the wave source may be one of any number of different types used with well known transmission techniques wherein the transmitted wave may unambiguously be detected into one of two possible states. There are virtually no limitations as to the type of wave transmission that may be used with the distance measuring device of the present invention. For example, a carrier-on, carrier-off transmission scheme may be used. In addition, any type of modulation scheme that permits the unambiguous demodulation or decoding into one of two possible states may be used. Typical modulation techniques include amplitude modulation, frequency modulation, polarization modulation and phase modulation. Such modulation techniques are well known to those skilled in the art and each permits the unambiguous demodulation into one of two possible states.

Multiple modulation techniques may be used to provide inherent transmission enhancement and to increase the flexibility and universality of the distance measuring device to accommodate a number of different measuring applications. An active transponder, for example, can be located at the reflector or remote target to receive and change the modulation scheme of the transmitted wave so that the reflected or returned wave is retransmitted with a different modulation scheme. For example, an amplitude modulated (AM) continuous wave can be transmitted from the wave source to the reflector, received by the transponder at the reflector, and remodulated in a different modulation scheme, for example, frequency modulation (FM) for transmission back to and detection by an FM discriminator at the distance measuring device. Consequently, it is seen that a weak signal received at the reflector may be amplified or repeated by a transponder located at the reflector and retransmitted to the detector at the measuring device to compensate for any degradation in the originally transmitted signal that could otherwise render the signal undetectable or make its detection uncertain.

The non-zero time delay associated with the electronic components comprising the distance measuring device must be compensated to permit the accurate determination of a measured distance. In actuality, the period of oscillation P is equal to twice the interval of time for a wave to be transmitted from the wave source to the reflector and back to the detector plus the time delays associated with the electronics in turning the wave source "on" and "off". The oscillation period P can therefore be expressed by the formula:

$$P = \frac{1}{f} \text{ or } P = 2\tau' + \tau(\text{on}) + \tau(\text{off})$$

where $\tau(\text{on})$ is equal to the time delay in turning the wave source "on" and $\tau(\text{off})$ is equal to the time delay in turning the wave source "off".

One method that may be used to independently measure the time delay associated with the electronic devices and also to calibrate the "zero" point of a distance scale used with the distance measuring device is described by the following. The time delay associated with the electronic components is measured by placing the reflector 20 immediately adjacent the wave source 14 and the detector 24 so that the distance between the wave source and the reflector and the distance between the reflector and the detector is zero, that is, the path length is zero. The frequency of oscillation of the measuring device and accordingly, the period is determined during the calibration measurement and is expressed as:

$$P_{cal} = \frac{1}{f_{cal}}.$$

Since the path length is zero, the term $2\tau$ in the period of oscillation expression is reduced to zero leaving the remaining terms $\tau(\text{on}) + \tau(\text{off})$. Therefore the oscillation frequency at calibration $F_{cal}$ and therefore the period of oscillation at calibration is expressed by the equation $P_{cal} = \tau(\text{on}) + \tau(\text{off})$.

The frequency f or the period P during the distance measurement is described by the equation:

$$P = \frac{1}{f} = 2\tau' + \tau(\text{on}) + \tau(\text{off})$$

Substituting into the equation from above $$P = \frac{4nd}{C} + P_{cal}.$$

The fundamental equation for the absolute distance measuring device of the present invention is given by solving the above equation for d wherein $$d = \frac{C}{4n}(P - P_{cal})$$

or as alternately stated:

$$d = \frac{C}{4n}\left(\frac{1}{f} - \frac{1}{f_{cal}}\right).$$

The accuracy of the distance measuring device includes an error which is attributed to the following sources: the index of refraction n may vary spatially along the transmission path as well as with time; the precision of the frequency counter or period measuring device used; the jitter in the electronic time delay; the uncertainty in determining the end points of the continuous alternating wave due to the finite carrier frequency; and the uncertainty in determining the end points of the alternating continuous wave due to the finite signal-to-noise ratio of the detector. Each of the identified sources are evaluated to determine its contribution to the overall error of the measuring device as explained below.

The index of refraction n is affected by the barometric pressure, temperature, humidity and the wavelength of the continuous alternating wave when the wave is transmitted in air. Since the value n is not perfectly known, the normalized variance of n can be stated as $$\sigma n^2 = \frac{\text{variance }(n)}{<n>^2}.$$

If the distance is accurately known and is stable with time, the distance measuring device can be used as a refractometer to measure the refractivity of the medium in the propagation path.

The variance in the oscillation period P due to the non-zero resolution of the frequency counter or period measuring device is defined as $$\sigma\Delta^2 = \frac{\Delta^2}{12}.$$

The term $\Delta$ and the factor 12 come from the well known quantization noise theory
wherein $\Delta$ is the quantization level of the period measurement.
If the frequency resolution is represented by $\delta$ then $\Delta = \delta/f^2$.

The variance in the period P due to jitter in the electronics delay time is represented by $\sigma e^2$. The beginning and ending times of each oscillation period are uncertain because of the non-zero wavelength $\tau$ of the source of the continuous alternating waves. If it is assumed that the detector senses the intensity of the reflected signal, then the end times of the continuous wave are quantitized in units of one half the carrier cycle. That is, the intensity of an electromagnetic wave varies at twice the frequency of the field variations. The intensity is the square of the field amplitude and the field variations are sinusoidal. Consequently, both the maxima and the minima and the intensity are separated in time by $\tau/2v$ which for transmission of an electromagnetic wave is expressed by $n\tau/2C.$ Alternately stated, the temporal period of the intensity is $n\tau/2C$ and an intensity threshold detector will be quantized temporally by that interval. Recalling that two events must be detected to measure the frequency of the distance measuring device, the variance of the period P due to the variation of the intensity will be twice the variance due to the quantization or $$2 \frac{\frac{(n\lambda)^2}{2c}}{12}.$$

If the frequency measurement is sampled over a time interval, the quantization error is further reduced by a factor equal to the number of cycles measured, that is, the error is reduced by the factor T/p (time/period).

Since the sources of error in the period are substantially independent, the variances are additive and the variance of the period is expressed by the equation $$\sigma^2 p = \frac{\Delta^2}{12} + \sigma e^2 + \frac{2(n\lambda/2c)^2}{12\ T/p}$$

The variance of the period in the calibration mode is expressed by the equation $$\sigma^2 P_{cal} = \frac{\Delta^2 cal}{12} + \sigma e^2 + \frac{2(n\lambda/2C)^2}{12\ Tcal/Pcal}$$

The variance of the distance is expressed by the equation $\sigma d^2$. Substituting the known quantities from above into the equation, $\sigma d^2$ is expressed by the following equation $$\sigma d^2 = \left(\frac{C}{4n}\right)^2 (\sigma p^2 + \sigma P_{cal}^2) + d^2 \sigma n^2$$

Upon substitution of further terms, $$\sigma d^2 = d^2 \left[ \sigma n^2 + \frac{1}{(P - Pcal)^2} \left\{ \frac{\Delta^2}{12} + \frac{\Delta^2_{cal} + 2\sigma e^2}{12} + \left(\frac{n\lambda}{\sqrt{24\ C}}\right)^2 (P/T + Pcal/Tcal) \right\} \right]$$

If high quality sensors are used to measure the barometric pressure, temperature and humidity, the variance of the index of refraction $\tau n^2$ can approach an order of magnitude approximately equal to $10^{-6}$. Currently available single integrated circuit chip frequency counters have resolutions having an order of magnitude of $10^{-6}$ of the frequency. Utilizing more elaborate circuit designs for frequency counters can produce even better resolutions. Consequently, distances can be measured with the distance measuring device of the present invention having an accuracy on the order of approximately one part per million or better. If the clock of the frequency counter is made with a higher accuracy than the accuracy of measurement, the dominant distance measuring error is substantially the refractivity uncertainty.

Turning now to FIG. 3, a distance measuring device embodying the present invention is shown and generally designated 36. The device 36 comprises a driver 38 coupled to a laser diode 40 which when activated generates a beam of continuous light at a predetermined wavelength $\tau$. The output of the laser diode 40 passes through a beam splitter 42 and is transmitted to a cube reflector 44. The reflected wave is transmitted back to the beam splitter 42 and is detected by a photodetector 46. The output of the photodetector 46 is fed to an inverter 48 having its output 50 coupled to the input of the driver 38 so that the driver 38 is inhibited during the time that the photodetector 46 senses a reflected wave. At the end of the detection of the wave, the output signal from the photodetector 46 changes state causing the inverter 48 to provide an enabling signal at its output 50 to activate the driver 38. The output of the driver 38 again activates the laser diode 40 and a new wave train is generated. The output of the inverter 50 is also coupled to a frequency counter 52 which measures the frequency of the oscillation of the distance measuring device. The output 54 of the frequency counter 52 is coupled to a computer 56 which contains an instruction set for calculating the various parameters necessary to determine the distance between the measuring device and the reflector. As indicated above, the index of refractivity n is dependent upon a number of parameters. The magnitude of the parameters are sensed by a number of sensors for example, a pressure sensor 58, a temperature sensor 60 and a humidity sensor 62. The output of the sensors 58, 60 and 62 are coupled to the computer 56 via an input 64. The information sensed by the sensors is used by the instruction set in the computer 56 along with the frequency information to calculate the distance between the distance measuring device and the reflector. Information representative of the distance measurement is outputted by the computer on lead 66 and is inputted to a distance display device 68 to provide a visually perceptible distance measurement.

The continuous alternating wave frequency chosen in the distance measuring device embodying the present invention is not critical and may be different for different applications. For example, visible light may be used for short distances to provide highly accurate distance measurements. It may be desirable to use VHF radio frequencies for determining the distance between a vehicle or a person in a city since VHF signals penetrate most buildings. Consequently, a transponder could be located within a building and not in the line of site of the wave source.

Numerous substitutions and modifications may be made to the distance measuring device of the present invention to accommodate a given set of parameters and characteristics associated with the measuring circumstances. However, the operating principle of the distance measuring device embodying the present invention is substantially identical for each of the different possible applications. Therefore, the distance measuring device of the present invention has been described by way of illustration rather than limitation.

We claim:

1. A distance measuring device for measuring the distance between the device and a target, said device comprising:
    a source of continuous energy waves arranged for transmitting said energy waves along a path extending from said source to the target;
    control means coupled to said wave source for activating and deactivating said wave source, said source continuously transmitting said energy waves in response to being activated and said source not transmitting said energy waves in response to being deactivated;
    means located at said target for reflecting energy waves in a direction toward said device when such energy waves are transmitted in the direction of said target;
    a single means located at said device for receiving energy waves reflected from said reflecting means located at said target, and
    a single means located at and coupled to said receiving means for detecting the presence and absence of said energy waves, said detecting means being coupled to said control means and producing a first output signal in response to the detection of the absence of said energy waves to cause said control means to activate said wave source and producing a second output signal in response to the detection of the presence of said energy waves to cause said control means to deactivate said wave source, said wave source being alternately activated and deactivated at a frequency related to and representative of the distance between said device and said target.

2. A distance measuring device as defined in claim 1 wherein said source of energy waves comprises a sonic wave transmitter.

3. A distance measuring device as defined in claim 1 wherein said source of energy waves comprises an electromagnetic wave transmitter.

4. A distance measuring device as defined in claim 1 wherein said source of energy waves comprises a modulator.

5. A distance measuring device as defined in claim 1 wherein said detector includes a demodulator.

6. A distance measuring device as defined in claim 1 further comprising means coupled to said control means for measuring the frequency at which said wave source is alternately activated and deactivated.

7. A distance measuring device as defined in claim 1 wherein said reflecting means includes an active transponder for sensing and converting energy waves transmitted from said wave source having a first modulation type to a second different modulation type for transmission to and detection by said detector.

8. A distance measuring device as defined in claim 3 wherein the control means measures a distance between said wave source and a target according to the expression $$d = \frac{C}{4n}(P - P_{cal})$$

and wherein said control means measures a distance having a variance defined by the expression $$\sigma^2 d = d^2 \left[ \sigma n^2 + \frac{1}{(P - P_{cal})^2} \left\{ \frac{\Delta 2}{12} + \frac{\Delta\, cal^2}{12} + 2\sigma e^2 + \left(\frac{n\lambda}{\sqrt{24C}}\right)^2 \left(\frac{P}{T} + \frac{P_{cal}}{T_{cal}}\right) \right\} \right]$$

* * * * *